Dec. 24, 1940. O. W. BALL 2,225,965
FISHHOOK
Filed March 26, 1940
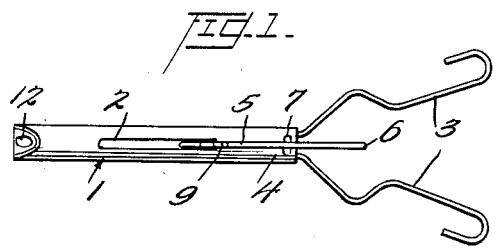
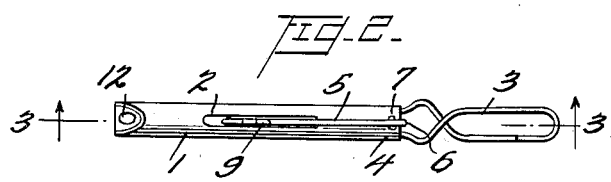
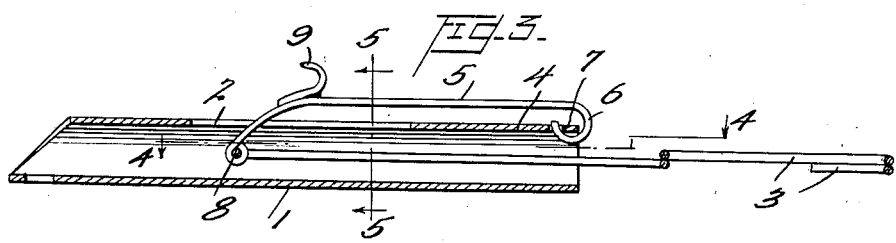
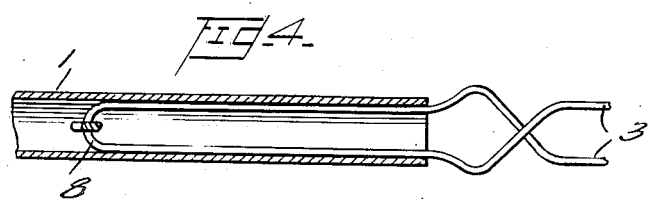 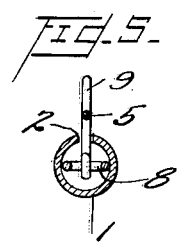
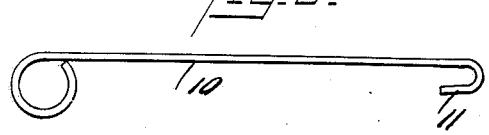
Inventor
Otis W. Ball
By C. W. Clement
Attorney Patented Dec. 24, 1940

2,225,965

UNITED STATES PATENT OFFICE 2,225,965

FISHHOOK

Otis W. Ball, Northumberland, Pa.

Application March 26, 1940, Serial No. 325,987

4 Claims. (Cl. 43—36)

This invention relates to fishhooks of the spring actuated type, the hook proper being concealed by bait on the top of the same, and when seized by a fish the hook is released in the mouth of the fish, thus holding it securely.

The hook is economical to manufacture, accurate in its action, strong, durable and efficient. The device is especially applicable for fishing in sea weed or other obstacles in which the common type of hook becomes entangled.

The various features of the invention will be more fully described in connection with the accompanying drawing, in which:

Figure 1 is a top plan view of the invention with a slot in the top of the cylindrical shield member with the fishhook member released.

Figure 2 is a top plan view of the same with the fishhook in closed position.

Figure 3 is a side elevation of the invention in its closed position.

Figure 4 is a sectional view of Figure 3 on line 4—4.

Figure 5 is a sectional view of the device on line 5—5 of Figure 3.

Figure 6 is a device to release the open hook from the mouth of a fish.

Referring to the drawing, 1 indicates a cylindrical shield member with a longitudinal slot 2 in the top of the same. 3 indicates a spring fish-hook adapted to fit into the closed end 4 of the shield member 1 and having a locking member 5 extending through the slot in the top of the shield member 1. The member 5 is provided with a hook 6 adapted to curve around the closed end of member 1 and engage an opening 7 in the same. The locking member 5 is pivoted to the fish hook member 3 at 8 within the shield 1. At the end of the locking member 5 is a hook 9 to which may be secured bait of any nature, said bait extending back over the shield and fishhook, thus concealing them from the fish. 10 indicates a hook releasing device with a hook 11 at one end which may be inserted into the mouth of a hooked fish to engage the released locking member thereby drawing the fish hook members together to liberate a caught fish. This is especially advantageous in case a fish of underweight or of too small size is caught since it may be released without tearing the mouth of the fish.

Barbs may be added to the hook without departing from the spirit of the invention.

The device can be secured to a fish line at the eyelet 12.

The operation of the invention is as follows:

The ends of the fishhook are compressed to a size suitable to be slipped into the end of the cylindrical shield and held in place by the pivoted locking arm whose end curves around the end of the cylindrical shield and engages an opening in the top of the same.

When a fish seizes the bait which is secured to the forward end of the locking arm, the pressure on said arm releases it from the opening in the top of the shield thus permitting the two prongs to spring outward and separate so that they engage the mouth of the fish and hold it securely.

What I claim as new and desire to secure by Letters Patent is:

1. A device of the character described comprising a cylindrical shield member with a longitudinal slot extending through a part of the top of the same, and spring hooks adapted to be inserted in one end of the shield member and held in place by a locking arm extending through said slot, substantially as described.

2. A device of the character described comprising a cylindrical shaped shield adapted to receive compressed fishhooks at one end, and means for locking said hooks in closed position, said hooks and locking means being pivotally connected within cylindrical shield.

3. A device of the character described comprising a cylindrical shaped shield member, fishhooks receivable in one end of said member, means for locking said hooks in closed position, means for securing bait on end of said locking means, and means for releasing the hooks from the mouth of a fish.

4. A device of the character described comprising a cylindrical receptacle having a longitudinal slot therein, a spring member adapted to be compressed and received in one end of said receptacle, hooks carried by said member, and a locking means pivoted to said member and extending through said slot, said locking means being adapted to hold said member compressed in the end of said receptacle with said hooks together.

OTIS W. BALL.